Aug. 28, 1934.　　　W. D. LA MONT　　　1,972,052
PROCESS OF AND APPARATUS FOR GENERATING STEAM
Filed April 15, 1931　　　5 Sheets-Sheet 2
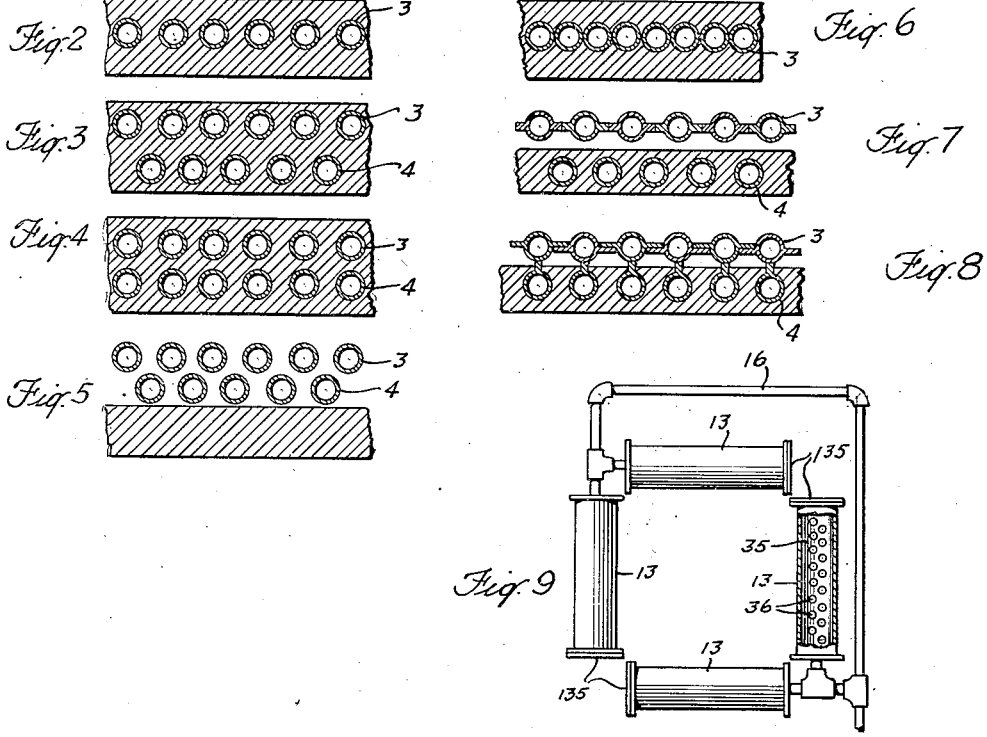
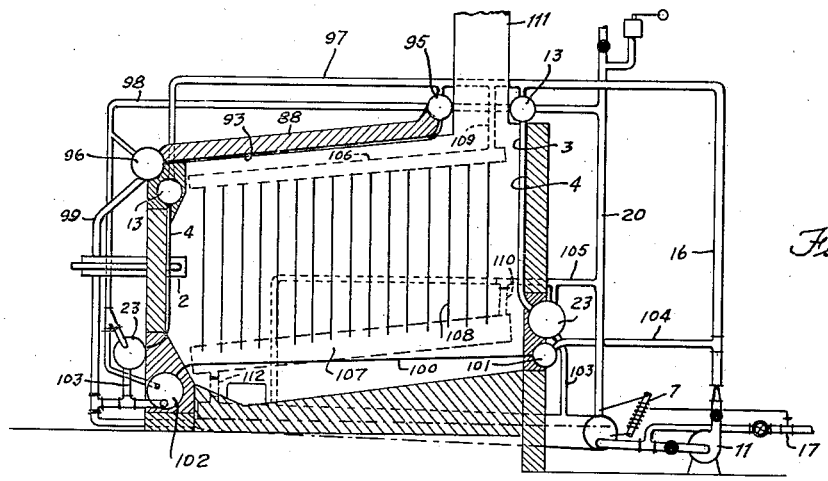
INVENTOR
WALTER DOUGLAS LAMONT
BY his ATTORNEY Aug. 28, 1934.  W. D. LA MONT  1,972,052
PROCESS OF AND APPARATUS FOR GENERATING STEAM
Filed April 15, 1931  5 Sheets—Sheet 3

INVENTOR
WALTER DOUGLAS LAMONT
BY his ATTORNEY

Aug. 28, 1934.   W. D. LA MONT   1,972,052
PROCESS OF AND APPARATUS FOR GENERATING STEAM
Filed April 15, 1931   5 Sheets-Sheet 4
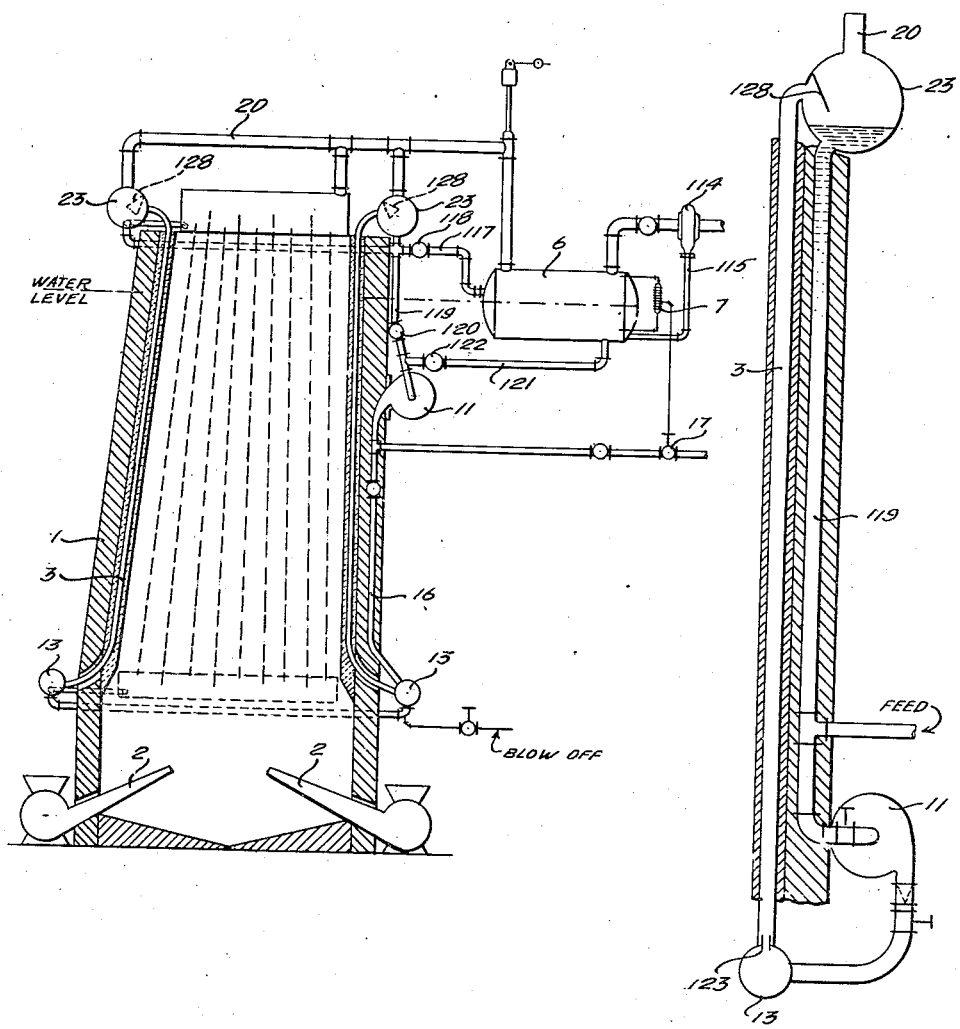
INVENTOR
WALTER DOUGLAS LAMONT
BY Newell & Spencer
his ATTORNEY

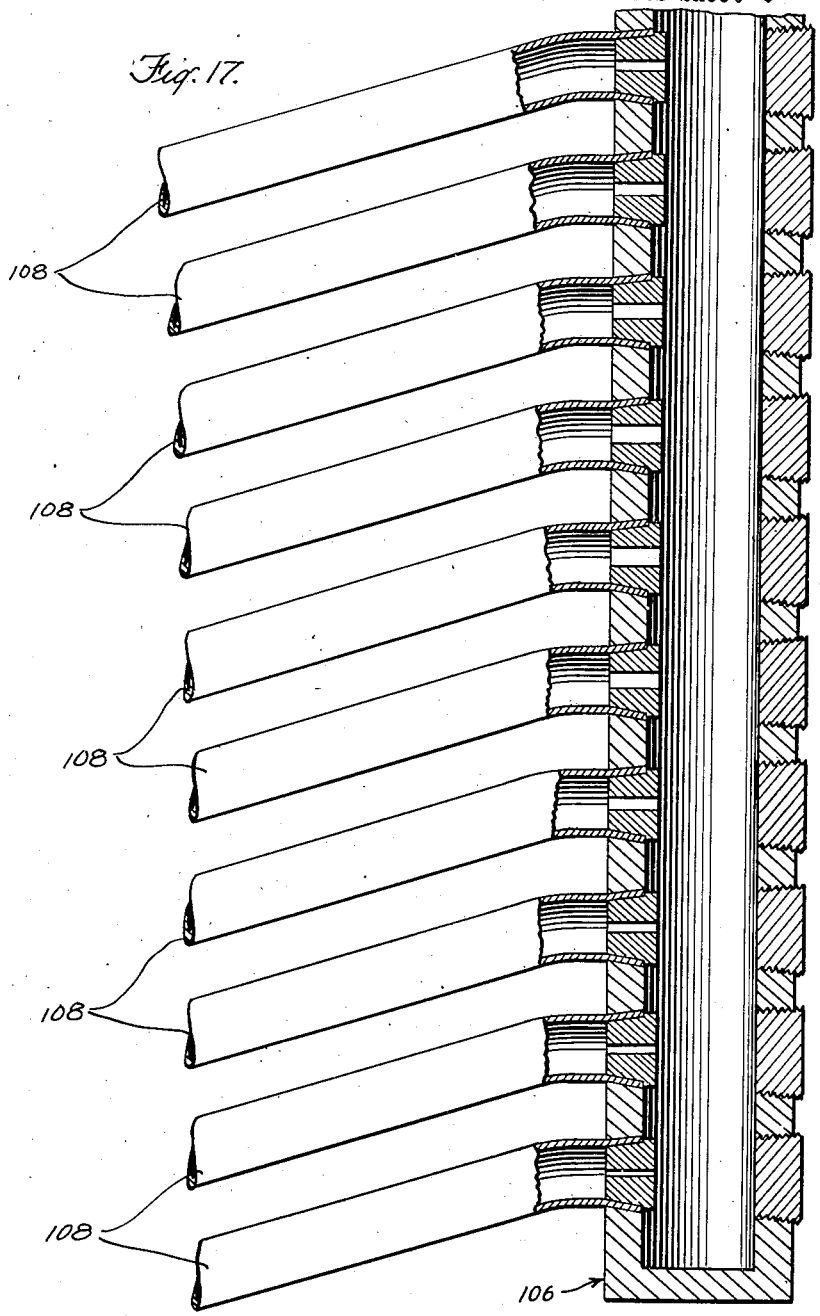

Patented Aug. 28, 1934

1,972,052

UNITED STATES PATENT OFFICE 1,972,052

PROCESS OF AND APPARATUS FOR GENERATING STEAM

Walter Douglas La Mont, North Colebrook, Conn., assignor to La Mont Corporation, New York, N. Y., a corporation of New York Application April 15, 1931, Serial No. 530,228
In Sweden October 19, 1925

26 Claims. (Cl. 122—39)

This invention relates to an apparatus for generating steam and particularly to a steam generator in which there is a positive and controlled supply of water to the steam generating elements and in which the heat for steam generation for the most part is received by the elements under the action of radiant heat in a heat chamber.

Heat chambers and furnaces of all types, both for the combustion of fuel therein and for the confinement of heat delivered thereinto by hot gases or other materials or produced by electric means, have heretofore presented serious problems of heat insulation and protection of the confining walls from the action of the gases or other materials of high temperature and from the deteriorating action of the radiant heat present or evolved in the furnace. Especially in furnaces constructed in connection with steam generators for the combustion of fuel to provide the heat for steam generation, attempts have been made heretofore to provide protection of the refractory materials of which the confining walls and structure are usually made either by the building into the walls themselves or by the placement adjacent to the wall but within the furnace, so as to shield the wall from the direct action of the radiant heat, of water tubes and especially tubes connected to the water space of the boiler with the purpose of providing circulation of the water through said tubes sufficient to permit steam generation within the tubes. Such tubes have heretofore been arranged in the conventional boiler vertically or substantially inclined to the horizontal for the purpose of permitting the so-called convection action of the heated water and the mixture of steam and water within the tube to produce a circulation of water through the tube, which water is drawn from the water space of the boiler through suitable connections exterior to the heat chamber and the heated water or mixture of steam and water is again delivered to the water space of the boiler.

While the aim and purpose of such arrangements have been to provide an adequate circulation of water through the tubes subjected to radiant heat, it has been found that the severe conditions under which steam is generated in such arrangements have prevented the securing of proper delivery of water to the tubes and circulation of water therethrough. These severe conditions are for the most part caused by the extremely high rate at which radiant heat is received by the surfaces of the tubes exposed thereto in a heat chamber. The steam generation within the tube is therefore extremely rapid and the volume of steam formed, being many times the volume of the water from which it is evaporated, occupies a large part of the space within the tube. As no provision has been made in such conventional arrangements for the easy flow of steam through the tube and its uninterrupted discharge therefrom and as it must travel upward through the tube and against the water which tends to remain in the tube under the hydraulic pressure of the water level of the boiler, the steam in its rapid expansion tends to force the water from the tube more rapidly than the convection action described can deliver the water to the lower end of the tube. The result is that the inner surfaces of the tube may be left uncovered with water, overheating of the metal upon which the radiant heat continues to fall may then occur, and ultimate rupture of the tube will result. In addition, the solids contained in the water are deposited upon the tube surface and may become dried thereon and thereby assist the burning action. All these conditions set limitations upon the capacity, flexibility of operation, safety and efficiency of steam generation under radiant heat in the so-called water wall or water wall boiler.

It has been attempted heretofore to meet these conditions in so-called convection circulation boilers by inserting propeller wheels or devices to induce a flow of water in the desired direction and pumps have been variously arranged with the purpose of producing the proper flow through tubes exposed to radiant heat. In all these, however, the problem presented due to the different conditions of steam generation in different tubes or in different sections of the boiler has not been appreciated. It is, therefore, the object of the present invention to provide for operation of water walls and for generating steam by use of radiant heat in such a way as to properly meet these conditions and to provide for steady and continuous circulation of the water through the water passages or tubes of the water wall or water wall boiler.

In my prior U. S. Reissue Letters Patent 16,895 I have disclosed a steam generator in which the water to be converted into steam is introduced into the upper end of a steam generating tube in quantity greater than can be converted into steam in its passage through the tube but less than sufficient to tend to fill the cross section of the tube as it gravitates through the tube, both the water and the steam being discharged from the lower end of the tube and provision being made outside the tube for separating the steam and the water and continuously returning the separated water to the upper end of the tube. In the construction disclosed in said Reissue Letters Patent gravity is employed as the primary force to cause the flow of water through the steam generating tube and cause a film of water to be extended upon the inner surface of the tube, the outer surface being exposed to the steam generating heat.

In my application for U. S. Letters Patent Serial No. 209,024, filed July 28, 1927, I have disclosed a method of steam generation in which the advantages obtained by the method of steam generation and the steam generator construction described in said Reissue Letters Patent can also be obtained with a steam generating tube in which water must flow through at least a part thereof without the aid of or against gravity. To carry out the steam generating process in such a generator with tubes so arranged, I provide a continuous unidirectional movement of steam and water through the tube toward a common discharge end by an adjustment, in relation to the steam generated in the tube, of the rate of delivery of water to the tube under the action of a forcing means, such as a pump, and by providing a tube of such diameter or internal cross sectional area in relation to said rate of steam generation and said rate of water delivery that while space is left for the steam within the tube a high velocity of steam flow is provided which is utilized to carry the water through the tube, contacting with the walls thereof, without interference with the steam flow by the water and without interference with the water flow by the steam flow.

I have found that steam generating tubes or elements of the type of my prior Patent 16,895 and of the type disclosed in said application Serial No. 209,024 may be used with particular advantage when exposed to radiant heat for the protection of walls of furnaces and for the purpose of steam generation. However, I have discovered that special conditions must be taken into account in the use of tubes when generating steam under the action of radiant heat. It is principally the provisions for meeting these special conditions which constitute the present invention. Moreover, I have discovered that these novel provisions are a practical necessity whether tubes of the type of my prior reissued Patent 16,895 or those of my application Serial No. 209,024 be used for whether steam generating tubes be operated in the manner of so-called "full" tubes.

"Full" tubes, in the sense in which the expression "full" has been applied by me to steam generating tubes, may be defined as tubes in which the amount of water present in the tube in relation to the amount of steam generated therein is not so limited that the water in relation to the cross sectional area of the tube does not occupy a large part of the space within the tube or is not so limited as not to produce "hydraulic" reaction within the tube. "Full tubes", therefore, may be said to be tubes in which the water occupies a large space within the tube and the steam may be said to be dispersed in the water rather than that the water is dispersed in the steam as in the tubes of my prior patent and application. "Full tubes" may receive the water to be evaporated by the so-called "convection circulation" mentioned above or the water may be delivered thereto by a positive means such as a pump. The present invention is concerned only with positive delivery of the water, but tubes operating in the various gradations from "full" tubes to "film" tubes, i. e., those "less than full", inclusive, are contemplated as being within the scope of the invention.

The conditions of steam generation under radiant heat referred to are in part due to the large volume of steam rapidly generated within the tube subjected to radiant heat and in part due to the resistance to flow of water and steam through the tube and in many cases to the resistance offered to the flow of water due to gravity when the water must run upward through the tube or connections therefrom to reach the steam and water separating space. The large volume of steam, which in some cases in practice may be as much as 200 times the volume of the water from which it is evaporated, tends to expand within the tube and thereby displace the water in the tube, i. e., to "gulp" it therefrom, and thus prevent the entrance of water thereinto. Furthermore, the flow of steam through the tube requires a pressure drop and there is thus set up a resistance or back pressure to the entrance of water into the tube. The flow of water through the tube similarly requires the expenditure of force to overcome resistance, which force acts against the entrance of water into the tube. Such forces therefore prevent the proper delivery of water to the tube and its flow therethrough unless suitable provision is made for positive delivery of the water to the tube and for forcing it into the tube and unless the quantity entering each tube is properly controlled in relation to the conditions of steam generation in the tube.

Whether tubes of the type of my prior Patent Re. 16,895 or of my application Serial No. 209,024 be used or whether "full" tubes be used, the tubes receiving radiant heat may be subjected to different degrees of the radiant heat because of their positions within the heat chamber or furnace or their positions in relation to the source of heat or because of other conditions. It therefore becomes necessary properly to control the delivery of the water into each tube so that an adequate amount of water will be delivered in relation to the steam generated in the tube and under such pressure at the inlet end of the tube that the "back pressures" and the resistances mentioned above will be overcome and the flow of water through the tube and its flow in contact with the heating surfaces thereof will be continuously maintained so as to keep the tube surfaces wet and thus prevent burning.

It will further be understood that in order to meet the structural conditions of the furnace as well as other conditions, such as the impingement of the fuel or of the gases, various sizes of tubes both as to diameter and as to length may be required and that tubes of various wall thickness may be used for different operating steam pressures or for proper mechanical strength or to provide a proper amount of material for stiffness or mechanical wear or abrasion. Such differences in dimensions in themselves may cause differences in the amount of heat absorbed by the tubes as well as in the resistances and other conditions of steam generation within the tubes. While the selection of the particular size of tube and its arrangement within the furnace is within the skill of the engineer, my invention provides for the apportionment of the water to the various tubes or to the various portions of the heating surface or to units of heating surface or sets of tubes in accordance with the steam generating conditions to which said tubes or surfaces or units or sections are subjected.

In the preferred embodiment of this invention I utilize tubes of the type described in my prior reissued Patent 16,895 or of the type disclosed in my co-pending application Serial No. 209,024. However, in the steam generators of the present invention, including so-called water walls and water wall boilers having tubes for the generation of steam in connection with a combustion chamber, whether using the tubes of my prior patent or of my application or whether using the so-called "full" tubes, the apportionment of the water in accordance with the amount of steam generated within each tube and its delivery under suitable conditions of pressure and velocity is necessary to properly supply all the steam generating surfaces with water to maintain the steam generation and to prevent the surfaces from becoming dry with consequent burning and rupture.

In the above and following discussions reference is made to delivery to the tubes or heating surface of a proper or suitable or adequate amount of water in excess of the steam generating capacity of the tube or heating surface. By these terms is meant an amount or quantity of water which while in said excess relation is, however, so limited or controlled that whether the tube or heating surface element is operating as a "full tube" or "film tube" there will be no substantial "gulping" of the water from the tube with the result that the surface thereof is left dry and subject to the possibility of burning.

In applying the broad principle of the invention, while other means such as are disclosed hereafter in connection with this invention may be used, I have found it advantageous in many cases to utilize an orifice at the entrance to each tube through which the water is caused to flow and thus to measure the amount of water entering each tube so as to deliver into each tube such an amount of water in relation to the total amount of water delivered to all the tubes that each tube receives its proper share of the water. In the use of the orifice or other restricting means it is also possible to provide such a pressure drop therethrough under the action of the positive circulating means, for example a pump, that the back pressure created within the tube and the other resistances acting against the flow of water into the tube may be overcome and the continuous supply of water in the desired amount may be maintained. The orifices which I may use in the present invention may be similar to those disclosed in my prior patent and application. While in said patent and application the function of these orifices is to limit the water so that the tube will receive an amount of water less than sufficient to fill it, the function of the orifice or an equivalent means in the present invention is to properly apportion to the respective tubes, to which the water is delivered in parallel, such an amount of water in relation to the total amount of water so delivered that each tube will receive its proper proportion of the water in relation to the steam generated and with due consideration for the particular steam generating conditions within the tube. When, therefore, tubes of the type of my prior patent or of my prior application hereinabove identified are utilized for steam generation under radiant heat conditions, as in the present invention, the orifice serves not only for limiting the quantity of water delivered into the tubes to leave space for the steam but in relation to other similar orifices further serves to meter the water delivered to the respective tubes. Thus there may be insured delivery to each tube of a quantity of water in accordance with its conditions of steam generation and preferably in excess of its steam generating capacity but less than sufficient to fill the internal cross sectional area thereof.

It will be understood that my invention is not limited to a particular type of tube or to its method of operation nor to a particular placement of tubes in respect to the heat falling thereon nor in respect to the direction of circulation of water therethrough. Since the water is delivered positively to the heating surface or to the inlet ends of the tubes, I may deliver the water so that its flow is upward or downward or horizontal or in any desired direction. The tubes may be placed in any position relative to the walls or to the source of heat and may be bent to extend along two or more walls or in any desired relation to other portions of the furnace or boiler structure. In all cases, however, a proper apportionment of the water, preferably delivered in excess of the steam generating capacity of the heating surface subjected to radiant heat, is accomplished in accordance with the present invention by means such as orifices or other restricting means so that the positive delivery of the water to the tubes is effective to carry the water into each tube or to each section of the heating surface in said excess relation.

When the heat distribution in a heat chamber is asymmetric from the heating standpoint so that certain walls or certain areas of walls or certain tubes or certain portions or units of the heating surface may receive a much greater amount of heat than other walls or areas or surfaces, the uneven heat distribution under such conditions may and usually does necessitate an asymmetric arrangement of water tubes. The combinations of tubes may be varied in different ways to bring about the proper utilization of the heat. The asymmetric impingement or uneven distribution of the heat upon the tubes or surfaces may and usually does produce an asymmetric operation of these tubes or surfaces in the manner described above. The hottest wall may be screened by a larger number of tubes or by a greater depth of tubes than the walls which are not exposed to such a large amount of heat. For successful operation and permanence, such arrangements require that the amount of water delivered to the tubes in the hottest zone be greater than the amount of water delivered to the tubes in the colder zone. In other words, the water circulation in quantity or velocity or both is to be apportioned according to the heat delivered to the various portions of the walls or heating surfaces. This circulation may be effected from a single water circulating means such as a pump, or a plurality of pumps may be used and suitable arrangements of pipes and connections may be provided to deliver the water to the respective tubes or heating surfaces. Control of the water delivered to the various portions of the heating surface may also be effected by valves or by selection of the capacity and operation of the pumps delivering the water to these different sections. Means may be provided which are actuated in proportion to the evaporation or the heating in particular sections so as to control or to vary the speed of circulation or the amount of water delivered to the respective sections. Such control means may also be adapted to provide for operation of different portions or sections at different pressures.

Various arrangements and modifications may be made within the spirit of the invention and those shown in the drawings and the more detailed description to follow are merely typical. They illustrate some of the many possible combinations included within the scope of the invention and in no sense are to be taken as limiting the invention.

Figs. 2 to 8 are horizontal sections through heat chamber walls showing various arrangements and types of tubes.

Fig. 9 is a plan view, partly broken away, of the upper header of the water wall shown in Fig. 1.

Figs. 12 and 13 are diagrammatic sections through heat chambers showing water walls shielding horizontal walls as well as vertical walls.

Fig. 14 is a section through the side water wall.

Fig. 15 is a diagrammatic section through water walls embodying an upward circulation of water and steam.

Fig. 16 is a detail section through a tube and the outside circulation of a water wall similar to those shown in Fig. 15 but provided with a water inlet orifice.

Fig. 17 shows a longitudinal section of a water inlet header furnished with devices providing orifices of different sizes for the different tubes.

Figure 1:
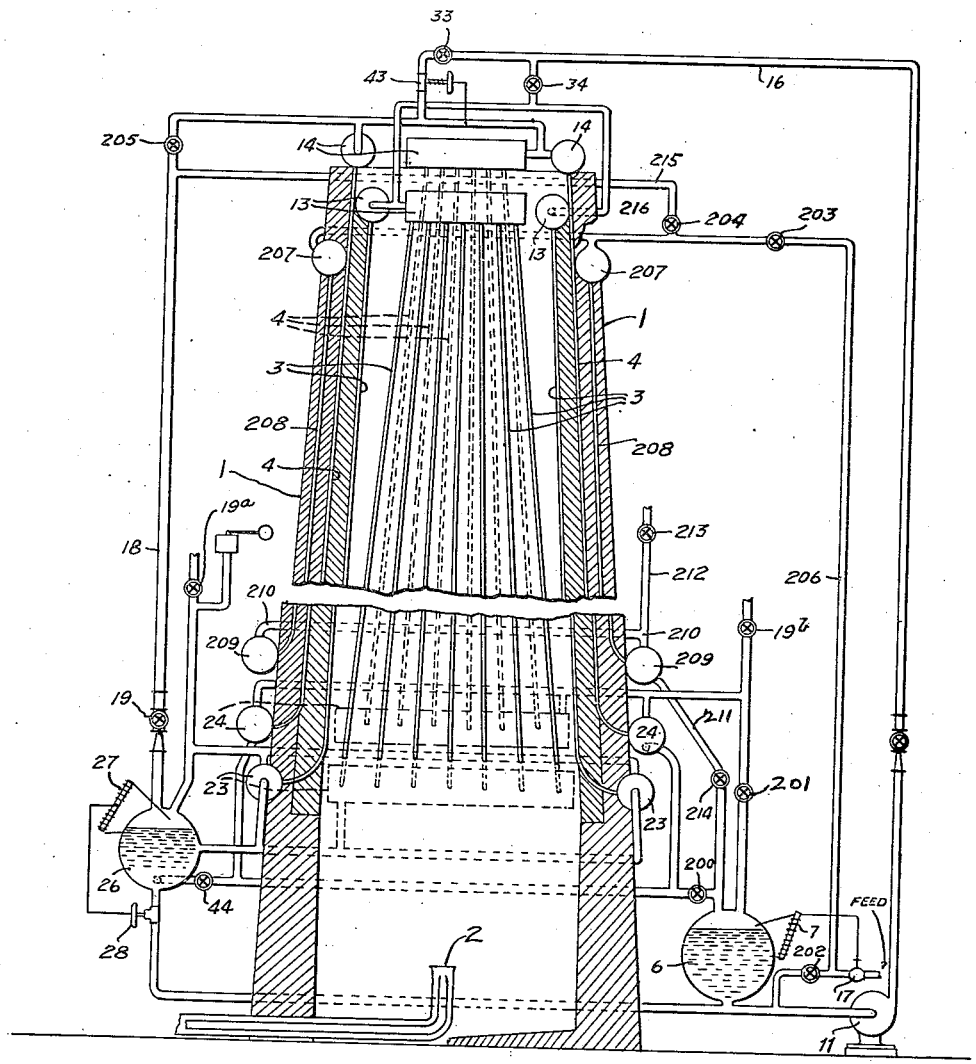
Fig. 1 is a diagrammatic section of the heat chamber and water wall, showing a combination of imbedded and screening tubes some of which may be used as steam generators, others as superheaters and still others as preheaters for water.

Fig. 1 shows a furnace in which tubes for steam generation according to the present invention are arranged in relation to the walls of the furnace for absorption of the radiant heat produced by the combustion of fuel within the furnace. The furnace walls are shown at 1 and the fuel burner at 2. Three sets or layers of steam generating tubes are shown, two layers being imbedded in the furnace wall. The tubes 3 are shown just inside and against the wall of the furnace, while the tubes 4 and 208 are shown arranged behind the tubes 3 and within the masonry of the wall. As shown in the figure, the back wall of the furnace has only two sets of tubes in staggered arrangement but this wall may also be arranged in the manner shown for the side walls of the furnace. The arrangement of the tubes in relation to the wall and in relation to each other may be as shown in Figs. 2 to 8 inclusive or in other arrangements to meet different conditions. Connected to the tubes at their upper ends are water inlet headers 13, 14 and 207. At their lower ends the tubes are connected to headers 23, 24 and 209 from which the steam generated within the tubes is discharged together with the excess water. A steam and water separator 6, connected by suitable pipes to the lower headers, receives the steam and water discharged from the headers and separation of the steam from the water is effected therein. The steam may be discharged to the place of use through the discharge pipe controlled by valves 201 and 19b. The water collected in the separator or receiver 6 is drawn by the pump 11 and forced through the pipe 16 to the upper headers 13 and 14, in quantity in excess of the evaporation within the tubes 3 and 4, the excess water being again discharged to the reservoir 6 as described above.

The tubes 3 and 4 being in different zones of heat due to their position relative to the wall may generate different amounts of steam. Provision is therefore made, in accordance with the present invention, to deliver water to these different layers or sets of tubes in accordance with the amount of steam generated therein. This may be accomplished by suitable control of the water flow to the different sets in accordance with the amount of steam generated in each set and under such conditions of pressure and velocity that each section is supplied with an amount of water suitable for its steam generating conditions. The pump 11 delivers water in quantity in excess of the steam generating capacity of the set and in accordance with the invention this water may be delivered and apportioned to the different sets in quantity in excess of the steam generated in each set. The different conditions of back pressure and resistance and the different amounts of steam generated in the different tubes and in the different sets may therefore be adequately provided for.

Figure 10:
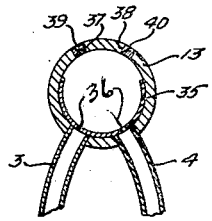
Figs. 10 and 11 are detailed sections of the inlet headers of the water wall showing various jet orifice constructions.
Figure 11:
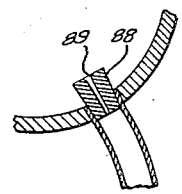

The control of the amount of water and the pressure and velocity under which it is supplied may be effected in various ways. For example, the valves 33 and 34 may be so adjusted by hand or by automatic control, if desired, that the proper quantities of water in said excess amounts are delivered to the sections containing the tubes 4 and 3 respectively; or pressure regulators may be used as indicated by the valve 43 to provide a constant or predetermined pressure upon the water inlet headers 13 and 14, which pressure may be utilized to deliver the proper excess amount of water to the sets of tubes connected to the respective headers. When these tubes are provided with orifices as shown in Figs. 10 and 11 and in Fig. 17, this pressure acting through the orifices may be utilized to apportion the water to the different tubes of the set. If desired, it may also be used to cause the operation of the tubes as so-called "film" tubes as described in my prior patent.

Control or adjustment of the valves 33 and 34 alone or in cooperation with the control effected by the pressure regulating valve 43 may be used in order to vary the circulation in accordance with the different evaporating capacities of the two sets of tubes as shown in Fig. 1. The two sets of tubes may operate at different pressures and may operate under different steam generating conditions within the tubes. The lower headers 23 of the inner set of tubes 3, therefore, may be connected to the steam and water separator or reservoir 26 which is provided with the water level control 27. This control operates valves 28 and varies the flow to the main reservoir 6 which is provided with the water level regulator 7 varying the intake of feed water by means of the valve 17. The pressure regulator 43, which is operated by the differential in pressure between the pipe 16 and the upper header 14, may serve to control the flow of water to the set of tubes 4 relative to the flow of water to the set of tubes 3 in accordance with the difference in pressure established by the different operating conditions in the tubes 3 relative to those in tubes 4. Such different conditions may include a difference in operating pressure or a difference in the resistance due to the amount of steam generated in ferent amounts of heat absorbed or other conditions.

In order to provide for operation of the sets or layers under different conditions, the pipe 18 may be provided with a valve 19 which may be shut and the steam discharged from the separator or reservoir 26 through the valve 19a while the steam from the reservoir 6 is discharged through the valve 19b. The pipe 18 is connected to the upper headers 14 through the valve 205. The tubes 4, therefore, also may be used as superheaters, when so desired, by passing therethrough steam from the separator 26 upon opening the valves 19 and 205.

The valves 33 and 34 may be set by hand to deliver the proper quantity of water to the respective headers 13 and 14, the quantity to be delivered depending upon the heat-absorbing conditions in the particular group of elements supplied. When both sets of tubes are generating steam and are operating at the same pressure the valves 33, 34 and 43 are opened and water from the pump circulating through the two sets of tubes is evenly affected by the operating pressure. If, however, as is frequently desirable, the tubes 4 are to be operated at a lower pressure than the tubes 3, the valve controller 43 is set for the proper differential and effects the desired drop in pressure of the water flowing through it into the header 14, and the pressure control automatically provides header 14 with water at the desired pressure, the delivery being in proportion to the amount evaporated. When both sets of tubes are to be operated at the same pressure the valve 44 in the pipe connecting reservoirs 26 and 6 is open, but where the different tubes operate at different pressures or where tubes 4 are operated as superheaters, the valve 44 is closed. In the latter case the valves 200 and 201 are closed and the water in excess of the steam generation in the tubes 3 is returned to the reservoir 6 through the valve 28 under control of the water level in the reservoir 26. The pressure in reservoir 26 being greater than in reservoir 6, the flow of water to the pump is insured.

The arrangement shown in Fig. 1 permits some of the heating elements to be used as steam generators, others as superheaters and still others as feed water heaters. When the various sets of tubes or heat-absorbing elements are used either in proximity to or embedded in the walls of a furnace, which walls are exposed to radiant heat, it is in general desirable that the tubes exposed to the highest temperatures be the steam generating tubes and in this figure the tubes 3 are used for this purpose. The tubes 4 may also be used as generating tubes and they may operate under different pressures as described above. The tubes 4, however, are imbedded in the walls of the structure and are somewhat screened by the steam generator tubes 3. Still further back of the tubes 4 are the tubes 208 which may be operated either as superheaters or as preheaters. In order that this mode of operation may be carried out, proper piping, suitably valved, is provided.

Thus, when both sets of tubes 3 and 4 are to be used as generator tubes and the tubes 208 used as superheater tubes, the valves 33, 34 and 43 are open or are adjusted to suit the steam generation conditions in the respective sets of tubes. The water supplied by the pump 11 then passes through the pipe 16, through the valves above mentioned, into the headers 13 and 14, down the respective tubes 3 and 4 to the lower headers 23 and 24. The excess water from the lower headers 24 will pass into either the collecting pot 26 or the pot 6, depending upon whether the valve 44 or the valve 200 is open. If both are open some of the water may pass to 26 and some to 6. Either one or the other of these valves must be open under these conditions to permit the excess water from 24 to be recirculated. If the valve 200 is closed and the valve 44 is open then the valve 28 would be set to be operated under normal conditions to permit the excess water to be returned to the pump. Excess water from the lower headers 23 will pass into the pot 26 and thence into the circulation.

Steam from the headers 23 passes to the pot 26 or it may pass out through the valve 19a. Steam from the headers 24 passes out through the valve 19b. Of course, the piping connecting the two headers 24 might also be connected to the pipe controlled by the valve 19a if desired although to avoid complicating the drawings more than is necessary this has not been shown in the drawings. With the tubes 4 operating as steam generators the valve 205 should be closed to prevent steam from entering the upper headers 14 or water being by-passed to the steam and water separator 26.

In the operation of the tubes 208 as superheaters, the steam from the pot 26 passes up the pipe 18, the valve 19 being open under these conditions, thence into the pipe 215 and through the valve 204, to the headers 207, down the tubes 208 to the lower headers 209, thence into the pipe 210 to the outlet 212 controlled by the valve 213. Under these conditions the valve 203 in the pipe 206 is closed and the valve 214 in the connection 211 is also closed.

The tubes 208 may also be operated as feed water heaters and for this purpose the valve 202 is closed to prevent the feed entering directly into the circulation. Feed water entering at the lower portion of the system passes through the valve 17, thence up the pipe 206 to the headers 207, the valve 203 being open while the valve 204 is closed so that no steam from the pot 26 may enter the upper headers 207. The water, after passing through the tubes 208 and reaching the lower headers 209, passes into the circulating system by means of the pipe 211 which is connected to the pot 6, the valve 214 now being open. Under these conditions, the valve 213 is closed. The operation of the tubes 208 as water preheaters does not effect the operation of the tubes 4 either as steam generators or as superheaters since the valves and connection provide for separate operation of the units as will be seen from a study of the drawings.

In the operation of the tubes 4 as shown in Fig. 1 as superheaters, as has been suggested above, the steam passes from the pot 26 through the pipe 18 to the upper headers 14, the valve 205 being open. This valve is provided in addition to the valve 19 because the latter serves the purpose of preventing steam from passing into the upper headers 14 when the tubes 4 are used as steam generators, but since the pipe 18 conveys the steam to either the headers 14, when the tubes 4 are used as superheaters, or to the headers 207, when the tubes 208 are used as superheaters, means must be provided to permit steam to flow to the pipes 215 when needed but prevent its flowing to the headers 14 when the tubes 4 are being used as generators. The valve 205 is this means.

The arrangements of water wall tubes which are possible are many and a few typical arrangements are shown in Figs. 2 to 8. Fig. 2 shows a single layer of tubes embedded in a wall and spaced a considerable distance apart. Figs. 3 and 4 show two layers, staggered in Fig. 3, and parallel in Fig. 4. Fig. 6 shows a layer of tubes embedded in the wall and arranged in close proximity to each other so that they practically touch. Fig. 5 shows a staggered arrangement of tubes in front of the heat chamber wall, while Figs. 7 and 8 show finned tubes in which one layer acts as a screen in front of the wall and the other is embedded in it. Of course, numerous other combinations and arrangements are possible and the invention is not limited to any particular arrangement of tubes.

The arrangement of the water inlet headers, for example the upper headers 13, is shown in Fig. 9. These upper headers, in which the generating tubes are fastened, in the arrangement shown are provided with an inner liner of approximately semi-circular shape and shown at 35 in Fig. 9. In this inner liner orifices 36 are formed which cause the water to be injected into the tubes 3 and 4. A detail section of this type of header is shown in Fig. 10. The tubes 3 and 4 are attached to the header 13 as by expanding them into it. Holes 37 and 38 provided with plugs 39 and 40 permit the introduction of an expanding tool in constructing the headers.

Figures 13, 14:
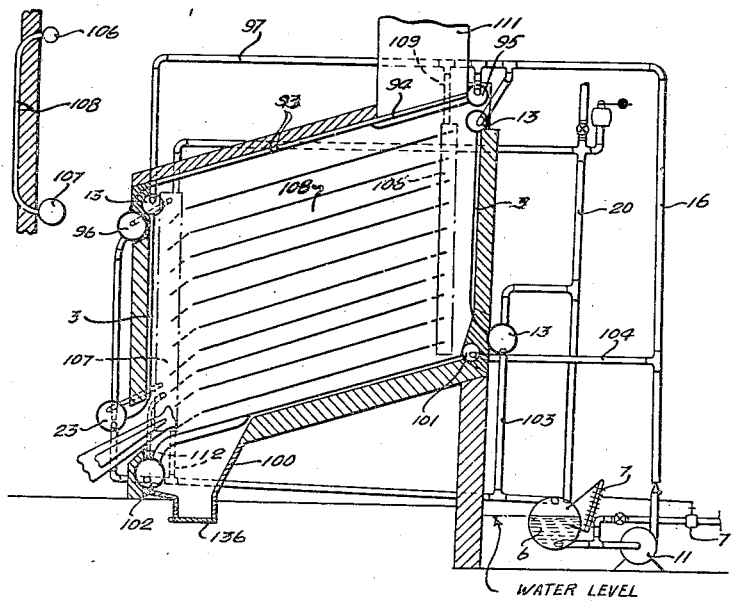

In Fig. 10 the inserted sleeve is shown providing the jet orifices registered with each tube which are necessary to produce the distribution or apportionment of the water to the tubes and, if so desired, to form a film on the inside of the tubes. Another simple type of orifice device is shown in Fig. 11 in which the plug 88 providing the orifice 89 takes the place of the sleeve 35 and orifice 36 shown in Fig. 10. These two detailed constructions are merely illustrations of a number of types of orifices which can be embodied in suitable header construction and in no sense limit the invention to the constructions and jet arrangements shown.

Where heat chambers are surrounded on four sides with walls, all four walls may be protected by tubes constituting water walls or water wall boilers embodying the present invention. Figs. 12 to 14 illustrate various types of installations of this nature. In Fig. 12, in addition to the water walls formed of vertical tubes 3 and 4, similar to those of Fig. 1, a water wall composed of tubes 93 is mounted in a slightly inclined position to screen the top of the heat chamber 88. Headers 95 and 96 are incorporated in the top water wall and are connected by pipes 97 and 98 with the water inlet and steam outlets of the vertical tubes respectively. A set of tubes 100 provided with water inlet header 101 and discharge header 102, constitutes a water wall or screen for the bottom of the heat chamber. Discharge header 96 is connected to discharge header 102 by the pipe 99 and lower headers 23 are connected to 102 by the pipe 103. Water inlet header 101 is in turn connected to pipe 16 of the water circulation system by the pipe 104. Steam from the header 102 passes out through connections to the pipe 98 and thence to the steam pipe 20 which also receives steam from the header 23 of the right hand vertical set through the pipe 105. The wall at the far side of the furnace is shown with upper water inlet header 106, lower or discharge header 107 and tubes 108. Circulating water is taken from the circulating pipe 16 through the pipe 109 and steam is discharged through the pipe 110 which connects with the pipe 105 leading from lower right hand header 23.

A common supply of feed water for all the sets of tubes is controlled by the water level controller 7 which controls the valve 17 in the usual manner to deliver the feed water into the water circulating system. Obviously, instead of providing a common circulation in parallel through all of the headers, separate circulating systems may be provided or the circulation may be in series through one or more units. Other combinations within the spirit of the invention may also be made.

It will be seen that the walls of the heat chamber are very thoroughly protected against radiant heat and heat due to convection, only a small portion, namely, flue 111 being unprotected by a water wall. The overall efficiency of the installation may be very high owing to the low heat loss through the furnace walls and the high heat absorption of the water cooled and steam generating surfaces interposed between the source of heat and the furnace walls.

Fig. 13 illustrates a heat chamber of similar shape to that shown in Fig. 12 but shows a modified placement of the side water wall tubes and also shows a more thorough screening of the flue. The water wall construction is, in general, similar to that shown in Fig. 12 with the exception that the top water wall is formed of very closely set tubes 93 which are, however, staggered over the portion registering with the flue 111 in order to permit free gas passage therethrough. The staggered portion is shown at 94. The circulation through the water wall is in parallel the same as is shown in Fig. 12.

In Fig. 13 the set of water wall tubes at the far side of the furnace consisting of headers 106 and 107 and tubes 108 is placed horizontally or inclined instead of in a vertical position as shown in Fig. 12. These tubes of Fig. 13 are shown longer than the vertical tubes shown in Fig. 12 and correspondingly have a different set of conditions of steam generation therein as described above. They may also be of different diameter or different wall thickness to suit structural or pressure conditions or other requirements. The parts are numbered as in Fig. 12 and the steam and water connections are similar except that instead of providing a single steam pipe 110 from the discharge header 107, two steam pipes are provided, one connecting to the lower header 23 and the other to the header 102 and also directly carried off to the header 102 and also directly through the pipes 112. The operation of the circulation and steam generation in general is the same as in the water wall boiler shown in Fig. 12, but the amount of steam generated in each tube and the resistances to flow therethrough may be quite different from those of Fig. 18 and also different as between various tubes or groups of tubes than is the case in Fig. 12. The heat loss in gases passing up the stack and in the small amount of radiant heat which might reach the stack walls is minimized in the arrangement in Fig. 13 as the portion of the water wall 94 through which the gases pass intercepts much of the radiant heat as well as absorbing the heat of the gases passing up the stack.

As has been suggested, the tubes in Figs. 12 and 13 in the various positions in relation to the walls of the furnace and in relation to each other are asymmetrically exposed to the heat of combustion generated within the furnace. Portions of the walls which are adjacent the burners are usually subjected to less heat than portions of the walls removed from the burner, that is, in locations where the flame in its expanded volume is projected toward or impinges upon the walls of the furnace. Also, beyond the point of full combustion of the flame the radiant heat effect may be somewhat lessened. Moreover, as is well known, the angle of incidence of the heat modifies the amount of heat which is absorbed by the heating surface exposed to radiant heat while as is also well known, the amount of radiant heat delivered to a cold surface such as steam generating surface is dependent in by far the greatest degree upon the temperature of the radiating body, that is to say, the flame or the solid particle in the flame. Other factor, such as air leakage, the amount of incrustations of soot and slag upon the heating surfaces, relation of the tube to the fuel body in the case of stokers or grates as well as the mechanical and constructional arrangement of the tubes within the furnace and the dimensions of the tubes themselves also affect the amount of heat absorbed. All these factors and others affect the amount of heat absorbed by the tube or by portions of the heating surface relative to other tubes or other portions of the heating surfaces. In general, therefore, the construction of the furnace will be asymmetric and the impingement of the heat upon the tubes will also be asymmetric or unequal and the steam generating conditions within the tubes will correspondingly be non-uniform or unequal. The distribution and apportionment of the water, therefore, to the different tubes or to portions or sections of the heating surface must be similarly made asymmetrical, non-uniform or unequal. The invention makes it possible to operate tubes or heating surface in accordance with the conditions to which they are subjected due to the radiant heat falling thereon whether the heat or these conditions are the same or different for different tubes or portions of the surface.

The methods and means described above in connection with Fig. 1 for apportioning the water may be utilized for such proper apportionment. The method and means to be more fully described hereafter in connection with Fig. 17 also may be utilized to accomplish apportionment under the conditions just described in connection with Figs. 12 and 13 or to suit any of the conditions produced in generating steam under the action of radiant heat.

Fig. 15 illustrates a water wall boiler with reverse circulation, that is to say, an upward circulation of water and steam through the water wall tubes. Water is forced from the pump 11 through the intake headers 13 and up through the tubes 3. Steam and water may be separated in the outlet headers or drums 23 and the steam may escape through the steam pipe 20, the unevaporated water returning to the pump through the pipe 119.

In the embodiment shown in Fig. 15 there is also provided a steam and water tank 6 into which the water and steam from the outlet headers 23 may be discharged and in which they may be separated. The connection 117 between the outlet headers 23 and the tank 6 and also the connection 121 from the tank to the pump may be provided respectively with the valve 118 and the valve 122. When these valves are closed the water return is wholly through the pipe 119 direct to the pump, the valve 120 being open. Where it is desired to circulate all of the water through the tank 6, the valve 120 is closed and the valves 118 and 122 are opened, whereupon the whole of the water from the outlet headers 23 is obliged to circulate through steam and water separating tank 6 and thence through pipe 121 to the pump. A steam trap 114 with a drain pipe 115 is provided in the steam line beyond the separating tank. Baffles 128 are preferably incorporated in the upper headers in order to effect a more thorough separation of steam and water.

Fig. 17 shows a longitudinal section of water inlet header such as the header 13 or 14 in Fig. 1 or the header 106 in Figs. 12, 13 and 14 or the header 13 in Figs. 15 and 16. In the embodiment shown in this figure the orifice device is of the same type as shown in Fig. 11 and consists of a plug 88 having a hole 89 bored therethrough through which the water enters the tube under the pressure of the pump. The different tubes 3 or 108 exposed to the radiant heat of the furnace may generate different amounts of steam under different conditions of resistance and back pressure. The pressure applied to the orifice, therefore, must be sufficient to overcome the pressure within the tube acting against the entrance of the water through the orifice. By providing an adequate pressure under the action of the pump the water may be forced into each tube and the back pressure and resistance may be overcome. In order that the proper quantity of water shall enter the tube in accordance with the steam generating conditions and in relation to the amount of steam generated in each tube, the orifices 89 are made of such size in consideration of the pressure applied thereto that each tube receives through the orifice placed at its inlet end the proper quantity of water in excess of the evaporation. When to the header 13 or 106 is applied a pressure adequate to overcome the resistances, those tubes which generate a greater amount of steam than others are normally provided with an orifice of larger area than those which generate steam in less quantity. For example, in Fig. 12, in consideration of the normal form of the flame of fuel burned in the burner 2 the tubes adjacent the central portion of the set of tubes 108 would normally receive a larger amount of heat than the tubes adjacent the burner or those at the extreme right portion of the set. With a given pressure imposed upon the orifices in the header 106, therefore, the orifices for the tubes in the central portion of the set would normally be of larger area than those at the end portions of the set.

Similarly, in Fig. 13, tubes in the lower portion of the set of tubes 108 may receive a greater amount of heat than those in the upper portion of the set. The tubes in this portion would normally, therefore, be furnished with orifices of larger diameter than those in the upper portion of the set. In view, however, of the location of the tubes in the lower portion of the set relative to those in the upper portion of the set, that is, in view of the different elevations of the inlet ends of the tubes as connected to the header 106, a different head of water is applied to the inlet ends of the tubes, that is, to the orifices located at their inlet ends. It is, therefore, necessary so to modify the area of the orifice through which the water is forced into the tube in view of the different pressures applied to the orifices with the arrangement shown in Fig. 13 that the desired excess amount of water is delivered to the tubes in relation to the steam generated therein. In other words, the apportionment of the water to the various tubes must be made in consideration of the pressure applied to overcome the resistances, which pressure may be different due to the arrangement of the tubes, as just described, and in consideration of the amount of steam generated in the tubes. Therefore, in order that different tubes subjected to different amounts of heat of radiation and, it may be, of different lengths and diameters in consideration of the exposure to the heat and structural conditions, shall be adequately supplied with water, the orifices are made of different sizes or areas with due regard to the pressure applied thereto by the pump and an apportionment of the quantity of water delivered by the pump in proper relation to the various amounts of steam generated in the various tubes is effected.

It will be understood that in addition to the distribution and apportionment of the water just described the apportionment effected by the valves 33 and 34 and by the pressure regulator 43, as described in connection with Fig. 1, may be used. Distribution and apportionment to a set of tubes or surfaces or to portions of a steam generating surface may be therefore combined with the method of distribution and apportionment by the use of individual orifices or water flow restricting devices. Combinations of these methods of apportionment may be also used to operate the sections or units at different pressures and at the same time apportion the water in accordance with the amount of steam generated in the different sections. The orifices also may be so proportioned in one set of tubes as compared with those in another set that one set may operate at a different pressure than the other set by utilizing the different pressure drop through orifices of different areas. The orifices and the valves 33 and 34, as well as the valve 43, may therefore operate to accomplish a pressure drop or reduction in pressure of the water supplied to the tubes. Stated another way the orifice serves to set up a pressure against which the back pressure within the tube may react. The pressure drop or pressure difference is therefore available for effecting the distribution or apportionment of the water to the different portions of the heating surface, that is, to the different tubes or different sections or units or different areas which are subjected to different amounts of radiant heat or operate under different steam generating conditions.

Fig. 16 shows diagrammatically in somewhat enlarged proportions a tube 3, arranged similarly to the tubes shown in Fig. 15, to the lower end of which the water is delivered by the pump. The circulation of the water through the tube and the return of the water from the upper header or drum 23 through the pipe 119 is effected in a similar manner to that described in Fig. 15. At the lower or water inlet end of the tube 3 in the arrangement in Fig. 16 an orifice member 123 is provided which conveniently may be of the type shown in Fig. 11 or other suitable construction. The function of this orifice within the scope of the invention may be that described above in connection with tubes generating steam according to the process described in my copending application, Serial No. 209,024.

When, however, a plurality of tubes 3 are connected to the lower header 13 in parallel and each tube is provided with an orifice device 123 of suitable construction, the orifices may function in the manner also described above to distribute or apportion the water to the different tubes in accordance with the different steam generating conditions therein. The pressure produced in the header 13 by the pump 11 is effective to produce a flow of water through the orifice with a reduction of pressure in its passage through said orifice. As has been indicated, when this reduction in pressure is greater than the resistances present in the tube, due to the steam generation therein and due to the resistance to the flow of steam and water through the tube to the upper end thereof, the back flow of water through the orifice is prevented and consequently any circulation between the different tubes is prevented and each tube then receives its proper allotment of water to suit the steam generating conditions therein. As the pump is arranged to deliver a quantity of water which is in excess of the total amount of steam which is evaporated in all the tubes, the orifices then cause the distribution or apportionment of this water to the various tubes with the pressure drop described, the size of the orifice associated with each tube being such that an area is provided for a flow of water therethrough which, under the pressure or head imposed thereon by the pump, causes the water to flow into the tube through the orifice in an amount in excess of the steam generated in the tube. Each tube, therefore, receives water adequately in excess of its steam generating capacity and this water is forced to flow toward the outlet end of the tube together with the steam generated. As has been explained, preferably the proportions of the tubes and the orifice sizes in relation to the amount of steam generated and the quantity of water delivered in excess of the steam generated in the tube are so chosen that the steam generation is carried on according to the process of my prior application, Serial No. 209,024 in which the tubes are provided with water less than sufficient to fill them in the manner therein set forth and in which the flow of water through the tube is effected without regard to the use or influence of gravity.

This application is a continuation in part of my co-pending application for Letters Patent Serial No. 32,064, filed May 22, 1925, and is also a continuation in part of my co-pending application for Letters Patent Serial No. 77,816, filed December 26, 1925.

What is claimed as new is:

1. A steam generator comprising a plurality of steam generating surfaces arranged to receive different amounts of the radiant heat of a furnace chamber, means for positively delivering to said surfaces water in excess of the total steam generating capacity thereof, and means restricting the amount of water delivered to each surface, said means being so proportioned with respect to each other as to apportion the amounts of water delivered to the various surfaces in relation to the whole quantity of water delivered by said delivery means so that said amounts are in excess of the steam generated by said various surfaces but the water from which the steam is generated on each surface is restricted to leave free a space into which the steam as it is generated on said surface may immediately escape so that said water and the steam generated therefrom do not interfere with each other to prevent the water covering said surface and the steam being released therefrom.

2. A steam generator comprising steam generating surfaces arranged about the combustion chamber of the generator to form a radiant heat intercepting water wall exposed to various heats in different portions, means for positively supplying water to the surfaces of the water wall intercepting the radiant heat, and means restricting the flow of water to each portion of the surface and so constructed as to apportion it to the different portions in such relation to the heat intercepted thereby that a continuous film of water flows over said surface and beyond the film of water is a free space into which the rapidly formed steam bubbles may immediately escape without interrupting the continuity of the film or insulating the water from the wall subjected to the radiant heat.

3. A steam generator comprising banks of tubes arranged about the combustion chamber of a generator to form a radiant heat intercepting water wall exposed to asymmetric heat conditions, intake and discharge headers connecting said tubes, jet orifices in the intake headers associated with the tubes, a pump for circulating water through a positively defined circuit including said tubes in quantity in excess of the evaporation in the tubes, the jet orifices being so proportioned with respect to each other and in relation to the quantity delivered by the pump that the water delivered into the tubes is apportioned thereto and controlled so that a continuous film of water flows over the inner surface of that side of each tube which is exposed to the radiant heat in amount in excess of the evaporation from said surface and behind the film thus formed is a free space in each tube into which the rapidly formed steam bubbles may immediately escape without interrupting the continuity of the film or insulating the water from that portion of the wall of the tube subjected to the radiant heat.

4. A water-wall boiler comprising banks of tubes arranged about the combustion chamber of the generator so as to form a radiant heat intercepting water wall, intake and discharge headers for said tubes, a pump for circulating water in one direction through a positively defined circuit including said tubes, means for restricting the delivery of water to the tubes in such manner that the proper amount of water is apportioned to each tube, said water wall boiler comprising a plurality of units, and means for operating the units at different pressures.

5. A steam generator comprising banks of tubes arranged about the combustion chamber of the generator so as to form a waterwall asymmetrically intercepting the radiant heat of combustion, intake and discharge headers to which at opposite ends of the tubes said tubes are connected to form the banks, a conduit connecting the discharge headers to the inlet headers, a pump in said conduit arranged to positively cause water to flow therethrough in a direction toward the inlet header and in quantity in excess of the whole evaporation in the tubes, means associated with each tube at the inlet end thereof for restricting the flow of water into said tube, said means providing different amounts of restriction of said water to the different tubes and being so arranged as to a portion to each tube in relation to the other tubes of the bank the water delivered to the intake header of the bank so as to be in such relation to the various steam generating conditions of the tubes produced by the asymmetrical heating thereof that the flow of water through each tube is in excess of the evaporation therein, said restricting means controlling the water flow into each tube to leave free a space into which the steam generated within the tube may immediately escape and the steam and water within the tube do not interfere with each other and with their flow toward said discharge headers.

6. A steam generator comprising a plurality of steam generating tubes arranged in a plurality of layers adjacent the walls of a furnace so as to be subjected to the different degrees of the radiant heat of combustion, headers connected to one end of the tubes of each layer, means connected to the headers for continuously delivering thereto water in excess of the steam generated in the tubes, means associated with each layer for apportioning the water thereto in relation to the heat conditions to which the layer is subjected while in excess of the steam evaporated in each tube.

7. A steam generator comprising a plurality of sets of steam generating tubes subjected to various conditions of radiant heat in a furnace, headers connected to one end of the tubes of each set, means connected to the headers for delivering thereto water in excess of the steam generated in the tubes, means associated with each set for apportioning the water to the tubes of the set in relation to the heat conditions to which the set is subjected while in excess of the steam evaporated in each tube.

8. A water wall boiler comprising a heat chamber, a source of heat, the walls of the heat chamber having zones of different heats, tubular walls screening said heat chamber walls, and being divided into units corresponding to various heat zones on the walls of the chamber, and means for positively apportioning water to the units in accordance with the heat to which they are subjected, means for operating some of the units in the hottest zones as steam generators, said means including means for operating at will other units as feed water heaters and steam superheaters while cutting off the positive apportionment thereto of the water for steam generation.

9. A steam generator comprising a plurality of tubes arranged to receive different amounts of the radiant heat of a furnace chamber, a pump having its discharge connected in parallel to one end of each tube and constructed and arranged positively to deliver water in amount sufficient for the steam generating capacity of the tubes, and means providing a flow-controlling orifice at the water receiving end of each tube to limit the quantity of water entering each tube and to apportion the water so that said quantity in proportion to the whole amount delivered by the pump is sufficient for the steam generated in the particular tube by the radiant heat received thereby, said orifice being arranged to restrict flow of water into the tube to an amount which will leave space within the tube into which the steam may immediately escape to prevent mutual interference of the water and of the steam within the tube and to insure the wetting of the tube surfaces.

10. A steam generator comprising a steam generating surface having different portions thereof asymmetrically exposed to radiant heat and generating different amounts of steam on the various portions of said surface, means for positively delivering water to said surface in amount sufficient for the steam generated therefrom, means at the various points of delivery of the water to the surface arranged to control the amount of water delivered to various portions of the surface in relation to the whole amount delivered to the surface so that the water is positively apportioned to the various portions in amount sufficient for the steam generated on said portion but is restricted to leave free a space into which the steam as it is generated on said portion may immediately escape without interrupting the continuity of the water flow or preventing the water covering said portion of the surface.

11. A steam generator comprising a plurality of water tubes subjected to different amounts of radiant heat producing within the various tubes unequal conditions of steam generation and resistance to flow of water therethrough, a pump arranged to deliver to the tubes in parallel water under pressure and in quantity in excess of the steam generated in the generator, a device providing an orifice at the water inlet end of each tube through which the water is forced into the tube with a drop in pressure thereof, the size of each orifice being such that the drop in pressure is sufficient to overcome the back pressure and resistances in the tube due to the steam generation and to limit the amount of water delivered into the tubes to leave free a space within the tube into which the steam may immediately escape so as to insure the flow of steam and water to the other end of the tube without interference with each other, the sizes of the orifices in relation to each other being such that the total quantity of water is apportioned to the tubes in excess of the steam generated in each tube.

12. A process of generating steam which comprises positively delivering into heat exchanging relation to a source of radiant heat water in excess of the steam generated when confined in parallel paths of water flow and subjected in said paths to the asymmetric incidence of the radiant heat, controlling the delivery of water in each path in relation to the total amount of water delivered so as positively to apportion the water to the different paths and to provide a flow of water in each path in excess of that required for the steam produced by the heat incident thereon in said path, and limiting the flow of water in each path to provide space within the path into which the steam as it is formed may immediately escape so as to prevent mutual interference of the steam flow and the water flow in said paths.

13. The process of generating steam from water in contact with a plurality of steam generating surfaces subjected to different amounts of radiant heat which comprises positively delivering water to said surfaces in total quantity in excess of the steam generated therefrom, subdividing said delivery so as to cause the water to flow to the different portions of the surface in parallel, so limiting and apportioning the delivery of water to each portion in relation to the total quantity delivered to the surfaces and so causing its flow thereover that each portion receives a quantity in excess of the steam generated on said portion but the flow thereover is restricted so as to leave space beyond the film of water in contact with said portion into which the steam may escape from the film and the continuity of the wetting of said surface by the water may be maintained.

14. The process of generating steam under the action of radiant heat in a steam generator of the water tube type having its tubes subjected to different degrees of the radiant heat which comprises positively causing the water to flow in parallel through the water tubes in quantity in excess of the evaporation in the generator, so restricting the delivery of the water to the different tubes without restriction of the discharge of water and steam from said tubes as to apportion it to the different tubes and to cause the water to flow unidirectionally through each tube in excess of its steam generating capacity, and limiting the quantity delivered into each tube to leave free a space into which the steam may immediately escape so that the water and steam flowing through the tube do not interfere with each other in their flow through the tube and are freely discharged therefrom.

15. A steam generator comprising a plurality of sets of tubes subjected to different degrees of radiant heat, means for positively delivering water to the sets in parallel and in quantity in excess of the evaporation within the sets but in a direct relation to the amount of heat to which each set is subjected, said means including means for continuing operation of at least one of the sets as a steam generator and for causing at will delivery of feed water to at least one other set, said other set being subjected to heat suitable for operating said set as a feed water heater.

16. A steam generator comprising a plurality of sets of tubes subjected to different degrees of radiant heat, means for positively delivering water to the sets in parallel and for apportioning the water to the sets in quantity in excess of the evaporation within each set under the action of the radiant heat to which the set is subjected, means for continuing the operation of at least one set of tubes subjected to a greater amount of heat as a steam generator while causing at will delivery of feed water to at least one set of tubes subjected to a lesser amount of heat as a feed water heater.

17. A steam generator comprising a plurality of sets of tubes subjected to different degrees of radiant heat, means for positively delivering water to the sets in parallel and in quantity in excess of the evaporation within the sets but apportioned in a direct relation to the amount of heat to which the set is subjected, means arranged to act without stopping said delivery of water in said relation to at least one set of tubes subjected to a greater amount of heat for operation as a steam generator while cutting off delivery of water to at least one other set of tubes, means for separating from the excess water the steam generated in said first mentioned set, and means for delivering at will the separated steam to at least one of said other sets for superheating of said steam by flow through said set in apportioned relation to the heat to which said set is subjected.

18. A steam generator comprising a plurality of tubes subjected asymmetrically to radiant heat, means for positively delivering water to the tubes in parallel and effecting said delivery to groups of the tubes in a proportionate relation to the heats to which the groups are subjected, means operable at will for cutting off from some of the groups said delivery of water thereto and for connecting said cut-off groups for flow of another fluid therethrough in the same direction as the water flow, said fluid being water in a selected state as to its heat content including the states of steam to be superheated and feed water to be heated, said means being so arranged that said fluid is delivered in proportionate relation to the heats to which said groups are subjected.

19. Steam generator comprising steam generating tubes which are subjected to radiant heat and are so arranged that certain tubes are exposed to more heat than others, a water supply member connected to the tubes, means for positively delivering water to the tubes thru said water supply member in total quantity in excess of the steam generated in all said tubes, said water supply member and said tubes being so arranged and connected that a greater head of water is provided at the water receiving ends of those tubes which are exposed to the greater amount of radiant heat, and means associated with said water receiving ends for apportioning the water to and insuring unidirectional flow of the water thru all the tubes in excess in each tube of the steam generated therein due to the amount of heat it receives, said means being constructed and arranged to restrict the amount of water entering each tube so that space is left therein into which the steam as it is formed may immediately escape without interrupting the continuity of the water flow over the surface of the tube.

20. Steam generator comprising steam generating tubes which are subjected to radiant heat and are so arranged that certain tubes are exposed to greater heat than others, means for positively supplying to the inlet ends of the tubes water in total quantity greater than the evaporating capacity of all the tubes, and means restricting the quantity of water supplied to each tube for insuring the distribution of the water to the different tubes and the unidirectional flow thereof through said tubes, said means being so constructed with respect to each other and in relation to the total quantity of water supplied to the tubes that the water is apportioned to the different tubes and each tube receives water in quantity greater than the steam generated by the heat to which it is exposed but in quantity insufficient to fill its cross sectional area so as to leave space within the tube for the steam and preventing mutual interference of the water and the steam within the tube and their flow therethrough.

21. Steam generator comprising a plurality of sets of tubes subjected to different conditions of radiant heat, means for positively delivering water to the sets in parallel, means associated with the water inlet ends of the sets for apportioning thereto the water in suitable relation to the evaporation within the sets, said means and said sets being so arranged that at will water may be apportioned to some of the sets acting as steam generators while to others of the sets acting as feed water heaters feed water may be delivered for heating therein.

22. Process of generating steam in a plurality of fluid confining conduits so arranged with respect to a source of radiant heat as to be subject to an asymmetrical incidence of radiant heat upon the several conduits, which comprises positively delivering into the conduits water in quantity at least sufficient for the steam generated in the conduits, controlling the delivery of the water into each conduit in relation to the total amount of water delivered to the conduits so as positively to apportion the water to the different conduits and to cause it to flow in each conduit in quantity at least sufficient for the steam produced in said conduit by the heat incident thereon, and limiting the water delivered to flow in each conduit in relation to the steam generated therein to a quantity insufficient to so fill said conduit as to produce a hydraulic reaction upon the water within said conduit so as not to interfere with the free flow of the steam through each conduit and its free discharge therefrom while maintaining the flow of the water in said conduit in quantity sufficient for the steam produced therein.

23. In a steam generator, a plurality of steam generating tubes all exposed to radiant heat which varies in the intensity of its impact upon different tubes, means for compelling water to be delivered to said tubes for steam generation therein, and means for controlling the proportion of water delivered to each tube with respect to the total amount delivered to the tubes to an amount so proportioned to the radiant heat impact thereon that said tube will be supplied with water at least sufficient for the steam generated therein but not sufficient to so fill the tube as to produce a hydraulic reaction therein such as will interfere with the free escape of the steam from the tube.

24. A steam generator comprising a plurality of tubes arranged to receive radiant heat in different amounts on the different tubes, means for positively delivering water to said tubes in quantity sufficient for the steam generation, and means associated with the water receiving end of each tube for restricting the flow of water to said tubes, said restricting means being so proportioned with respect to each other and in relation to the quantity of water delivered by said water delivery means that the water delivered to said tubes is apportioned thereto and controlled so that water flows through each of said tubes in amount sufficient for the steam generated therein under the radiant heat received by said tube, but the amount delivered to each tube is restricted to leave a free space within the tube into which the steam as it is generated may immediately escape without interrupting the continuity of the water flow through the tube or insulating the water from the surface thereof.

25. A steam generator comprising a plurality of steam generating tubes arranged in a plurality of layers adjacent the walls of a furnace so that the layers are subjected to different degrees of the radiant heat of the furnace, means connected to said layers for delivering thereto in parallel water at least sufficient for the steam generated in said layers, means associated with each layer for apportioning the water thereto in relation to the heat conditions to which the layer is subjected so that each layer receives water at least sufficient for the steam generated therein.

26. A steam generator comprising a plurality of steam generating tubes arranged in a plurality of layers adjacent the walls of a furnace so that the layers are subjected to different degrees of the radiant heat of the furnace, means connected to said layers for delivering thereto in parallel water at least sufficient for the steam generated in said layers, means associated with each layer for apportioning the water thereto in relation to the heat conditions to which the layer is subjected so that each layer receives water at least sufficient for the steam generated therein but not sufficient to so fill the tubular passages of said layer as to produce a hydraulic reaction therein such as will interfere with the free escape of steam therefrom.

WALTER DOUGLAS LA MONT.

CERTIFICATE OF CORRECTION.

Patent No. 1,972,052.             August 28, 1934.

WALTER DOUGLAS LA MONT.

It is hereby certified that error appears in the printed specification of the above numbered patent requiring correction as follows: Page 9, line 67, claim 5, for the words "a portion" read apportion; and that the said Letters Patent should be read with this correction therein that the same may conform to the record of the case in the Patent Office.

Signed and sealed this 8th day of January, A. D. 1935.

Leslie Frazer (Seal)             Acting Commissioner of Patents.